United States Patent [19]
Hostetler

[11] 3,799,116

[45] Mar. 26, 1974

[54] METHOD AND APPARATUS FOR INSTALLING FEEDING SYSTEM CONVEYOR TUBES

[75] Inventor: Eldon Hostetler, Middlebury, Ind.

[73] Assignee: Chore-Time Equipment, Inc., Milford, Ind.

[22] Filed: May 22, 1972

[21] Appl. No.: 255,453

[52] U.S. Cl. .......................... 119/51 R, 119/52 AF
[51] Int. Cl. ............................................. A01k 05/00
[58] Field of Search ................... 119/51, 52 AF, 53; 33/174 N, 181 R, 373, 391

[56] References Cited
UNITED STATES PATENTS

| | | | |
|---|---|---|---|
| 3,707,772 | 1/1973 | Cotter | 33/373 |
| 3,598,087 | 8/1971 | Ramser | 119/56 R |
| 3,223,228 | 12/1965 | Ferris et al. | 119/52 AF |
| 3,050,176 | 8/1972 | Brelsford | 119/52 AF X |

*Primary Examiner*—Hugh R. Chamblee
*Attorney, Agent, or Firm*—Olson, Trexler, Wolters, Bushnell & Fosse, Ltd.

[57] ABSTRACT

A method and apparatus is disclosed for installing a feeding system conveyor tube to cause the conveyor to generally equally and simultaneously deliver feed to a plurality of feeding stations. An alignment gage is successively attached to preliminarily installed conveyor tube sections and the tube sections are angularly rotated to position feed outlets at a desired predetermined position. This desired position is indicated by the coincidence of a plumb pointer and a hack mark on a gage scale. After rotation into the desired position, each tube section is permanently clamped in place, and the gage is moved to a succeeding tube section.

10 Claims, 7 Drawing Figures

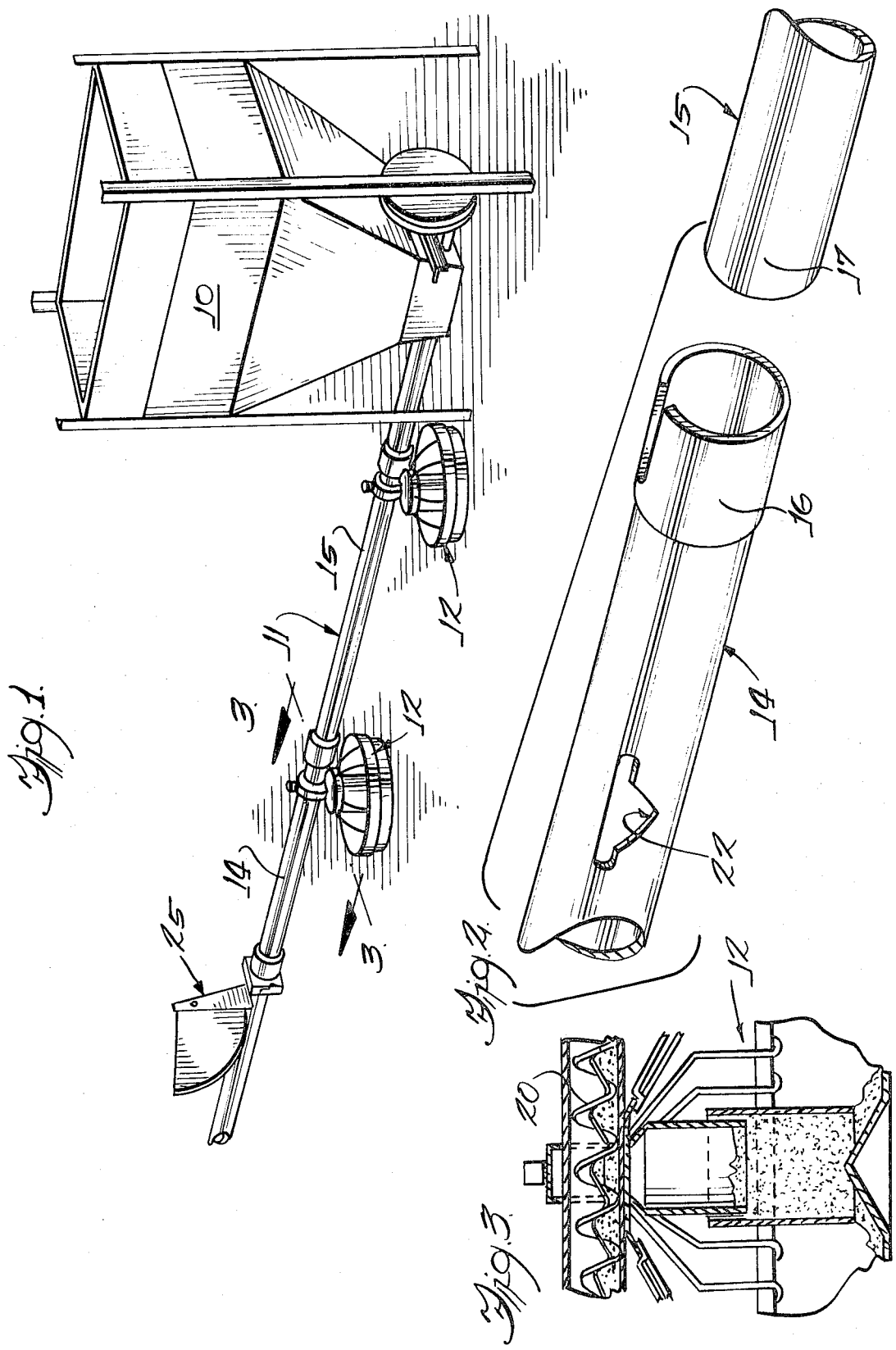

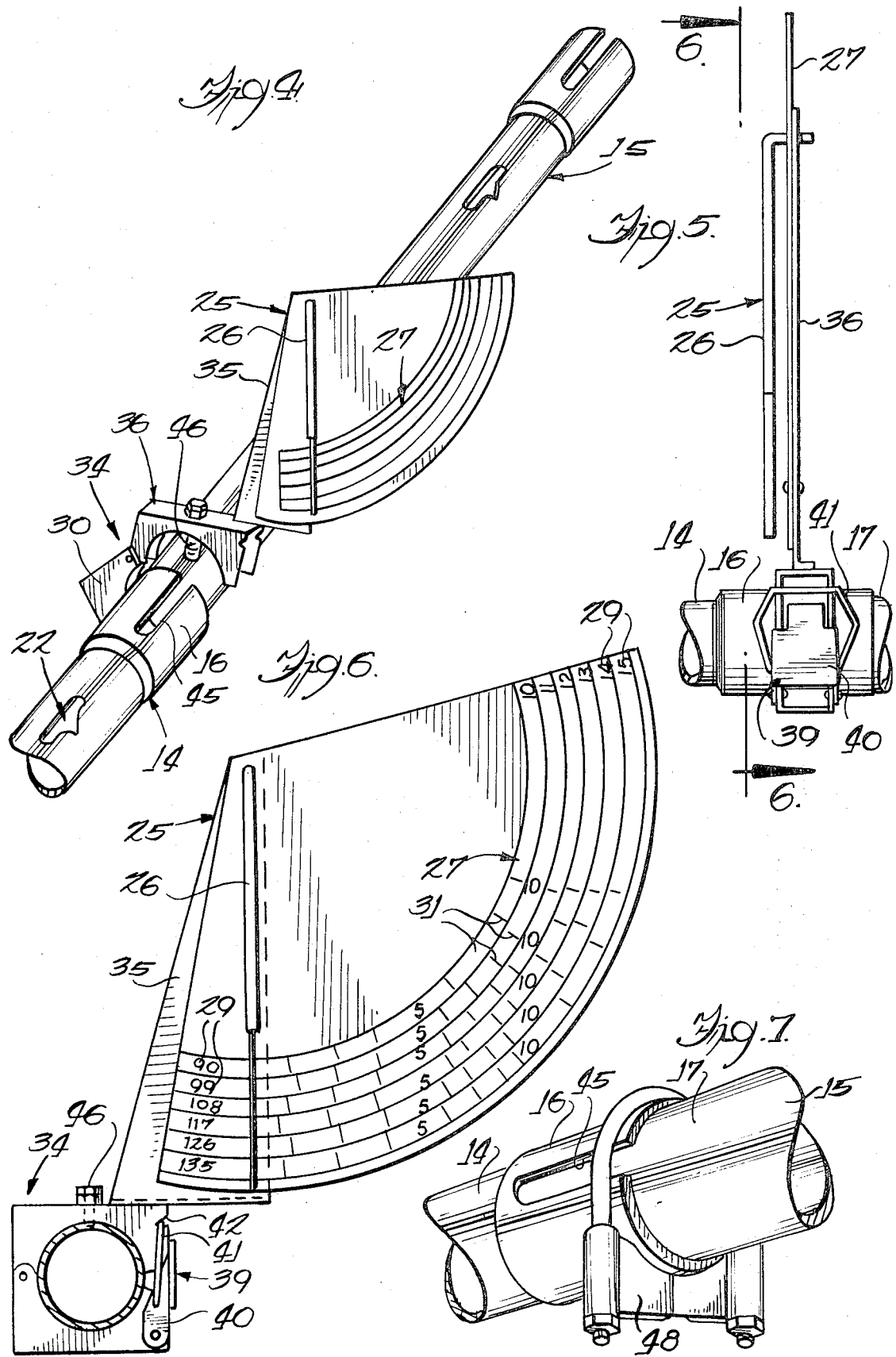

METHOD AND APPARATUS FOR INSTALLING FEEDING SYSTEM CONVEYOR TUBES

DESCRIPTION OF THE INVENTION

This invention relates generally to a method and associated apparatus for assembling feed dispensing conveyor systems.

Poultry feeding systems of the type described in U.S. Pat. No. 3,598,087 have become an important part of modern poultry care operations. In general, such feeding systems include a common feed source, which may be a bin, and one or more conveyors which are supplied with feed from the bin. These conveyors distribute the feed to a plurality of feeding stations disposed for ready access by the poultry. One such conveyor arrangement includes conveyor tubes inter-connecting the feeder stations and the bin, and helical augers rotated by a motor to move the feed through the tubes. For ease of manufacture and system assembly, the conveyor tubes comprise a series of tube sections connected end to end. Each section is provided with one or more holes or outlets through which the feed is dispensed into the feeding station.

In early systems, the conveyor tube sections were so positioned that the dispensing apertures or outlets opened vertically downwardly, and, as a result, the respective feeding stations were generally filled successively, or in seriatim order. This seriatim-order filling was found to occur because very little feed bypassed the first opening in the conveyor tube downstream from the bin until feed had accumulated in the feeder station to the level of the tube opening. This seriatim station filling is undesirable in some poultry feeding regimens.

U.S. Pat. No. 3,598,087 discloses that the problem of seriatim feed distribution may be overcome by circumferentially or angularly offsetting the dispensing openings with respect to the vertical plane. This conveyor tube installation arrangement has been successfully used in recently installed feedings systems.

Experience has taught that lengthy and tedious labor is occasionally required when installing these conveyor tubes with the distribution openings offset in a helical array as described. Each tube section must be carefully angularly positioned with respect to neighboring tubes and to the system as a whole. Alignment of the tube sections cannot always be accomplished by simple sighting-in methods. The angular positions of the tube sections may require repeated small adjustments. The installer has been required to keep in mind the relationships between the tube section he is working on, the adjacent sections, and the system as a whole.

It is therefore the principal object of this invention to provide a method and associated apparatus for quickly, easily and accurately installing the feeder system conveyor tube sections in a manner which will provide simultaneous and equal feed distribution to a plurality of feeding stations.

It is a more specific object of the invention to provide a method and apparatus whereby the angular relations of the feeder system tube sections can be quickly and accurately ascertained and properly adjusted during conveyor tube installation.

It is a related object of the invention to provide a sight gage which can be attached to the tube sections to provide accurate information regarding the angular position of the feed dispensing openings during installation. An ancillary object is to provide a sight gage of rugged design and low cost.

Other objects and advantages of the invention will become apparent upon reading the following detailed description and upon reference to the drawings.

DESCRIPTION OF THE DRAWINGS

FIG. 1 is an overall perspective view showing the general components of the feed distribution system and the novel gage used to assist in the installation of the conveyor tube sections;

FIG. 2 is a perspective view showing in further detail typical conveyor tube sections and a typical feed distribution outlet in the wall of one such tube;

FIG. 3 is a sectional view taken substantially in the plane of line 3—3 in FIG. 1 showing in further detail the arrangement of the conveyor tube, the feed auger carried within the tube, and a typical feeding station;

FIG. 4 is a fragmentary perspective view showing conveyor tube sections and the alignment gage positioned for temporary installation upon the tube sections as they are being permanently assembled;

FIG. 5 is a side elevational view showing in further detail the alignment gage installed upon the conveyor tube sections;

FIG. 6 is an elevational view taken in section substantially in the plane of line 6—6 in FIG. 5 and showing in further detail the tube alignment gage installed upon a feeder tube connection; and FIG. 7 is a fragmentary perspective view showing a typical permanent connection between adjacent conveyor tube sections.

DESCRIPTION OF THE ILLUSTRATED EMBODIMENT

While the invention will be described in connection with a preferred embodiment and procedure, it will be understood that it is not intended to limit the invention to that embodiment and procedure. On the contrary, it is intended to cover all alternatives, modifications and equivalents as may be included within the spirit and scope of the invention. In the following description, like reference numerals refer to like parts throughout the drawings.

Turning first to FIG. 1, there is shown a poultry feeding system of the general type described in U.S. Pat. No. 3,598,087. The system includes a dispensing bin 10 positioned and shaped to deliver feed to a tubular conveyor 11, which, in turn, distributes the feed to a plurality of poultry feeding stations 12. In the illustrated system, the tubular conveyor 11 consists of a series of individual tube sections 14 and 15 connected end to end. To facilitate this end to end connection, one end of a section 14 may be provided with an enlarged female sleeve portion 16 into which the male end 17 of an adjacent tube section 15 can be inserted. As shown in FIG. 3, the feed is moved from the dispensing bin 10 through the assembled conveyor 11 by a helical auger 20. The auger 20 is rotated by a motor drive or other known means not shown.

To permit the feed to drop from the conveyor 11 into the feeding stations 12, a number of outlets 22 are provided in the tube walls. In early feed dispensing systems, these outlets 22 were positioned at the bottom center of the conveyor tube so as to open vertically downwardly; with the tube outlets 22 so arranged, seriatim order filling of the stations 12 was found to occur. This sequential station filling took place because little feed bypassed the first 22 in the conveyor tube 11 until feed had accumulated in the feeder station 12 to the level of the tube opening 22, as may be envisioned from FIG. 3. As disclosed in U.S. Pat. No. 3,598,087, simultaneous and equalized feed distribution to the stations 12 may be encouraged by circumferentially or angularly offsetting these dispensing outlets 22 with respect to the vertical plane.

To assemble the conveyor 11 with the outlets 22 angularly offset or described a novel assembly gage 25 is provided. As may be seen in FIG. 1 and 4-6, the gage 25 includes a pointer needle 26 for indicating the actual angular position of the tube section 41 to which the gage is attached, and a scale 27 upon which are inscribed a series of desired angular positions for the tube section 14. It is a feature of the invention that the gage is of rugged design and of low manufactured cost, and to this end, the pointer means 26 may be a pointer needle mounted for plumb or vertically downward disposition when the gage 25 is attached to the tube section 14 as shown in FIG. 1 and 5.

So that the gage 25 may be used to install any one of a number of differing conveyors having differing numbers of tube sections in each conveyor, or differing tube section lengths, or differing feed dispensing outlets locations along each tube section, a plurality of scales 27 are provided, and identifying indicia 29 are located at the scale ends. As may be best seen from reference to FIG. 6, each scale 27 is calibrated or marked with an appropriate hack mark 31 indicating the desired angular position for successive tube sections.

Quick and easy attachment of the gage 25 to a tube section 14 is facilitated in accordance with another aspect of the invention by an attachment mechanism 34 rigidly connected to a scale back plate 35 and the scale 27. In the illustrated embodiment, this attachment mechanism 34 includes a clamp device having a clamp top 36, and a pivotally mounted clamp 38. The clamp top 36 and collar 38 are snugly secured around the tube section 14 by an over-center clamp 39, which includes a latch 40 pivotally mounted to the collar 38 and a latch wire 41 for engagement with a slot 42 in the clamp top 36.

To align the gage 25 in a predetermined position relative to the tube section 14 in accordance with yet another aspect of the invention, an alignment slot 45 is formed in each tube section 14, preferably in the expanded sleeve portion 16. A mating alignment pin 46 is mounted on the clamp top 36 in fixed relation to the scale 27, and is shaped to engage the alignment slot 45 on the tube section 14.

In carrying out the novel method of tube section installation described more fully below, it is helpful to install a permanent tube clamp such as the saddle clamp 48 illustrated in FIG. 7 in the tubes 14 and 15 before the gage 25 is removed. To this end, the slot 45 is formed to an axial depth sufficient to allow the width of the gage 25 and the clamp 48 to be simultaneously accommodated on the tube sleeve 16.

To assemble the feeder system conveyor 11 in accordance with another major aspect of the invention, the tube sections are first preliminarily assembled or installed in end to end relation, but are not permanently clamped together. Next, the described novel alignment gage 25 is temporarily attached to a first conveyor tube section. To provide clearance for the permanent saddle clamp 48, the gage 25 should be attached so that the alignment pin 46 abuts the end of the alignment slot 45. Ease and simplicity of assembly are enhanced if the gage 25 is first attached to the tube nearest the feed distribution bin 10, and that tube section aligned first. The tube section is then carefully twisted or angularly rotated to position the needle pointer 26 over the first hack mark 31 on the appropriate scale 27. When the tube section has been rotated to the desired angular position, the tube is permanently secured in that angular position by any commercial means such as the saddle clamp 48 shown in FIG. 7. The alignment gage 25 is then removed, and temporarily attached to the next succeeding tube section. This next tube section is rotated or twisted until the pointer 26 coincides with the second hack mark 31 on the appropriate gage scale, and the tube section is secured in its permanent position. This procedure is repeated for each tube section in the conveyor, until all the sections have been permanently installed. Confusion in finding the appropriate hack marks can be avoided by marking the tube section number on the tube sections during the preliminary installation. Lastly, the feeding stations 12 are secured to the conveyor 11 to coincide with the feed outlets 22 as illustrated in FIG. 3.

When the conveyor 11 is assembled as described herein, the feed outlets 22 will be arranged in a generally helical array of extended pitch. So arranged, feed will be delivered in a generally simultaneous and equal manner to all the feed receiving stations 12 on the conveyor 11.

The invention is claimed as follows:

1. Gage means for use in assembling a feeder system of the type having a dispensing bin, a plurality of feeder stations and at least one conveyor tube connecting the feeder stations and the dispensing bin, the conveyor tube including a plurality of tube sections connected end to end, each tube section having at least one feed-dispensing outlet in the tube wall to permit the flow of feed from the tube to a feeder station, said gage means including attachment means for attaching the gage means to a tube section to position the gage means in a pre-determined angular position relative to the feed-dispensing outlet, and means on said gage means for indicating the actual angular positions of said tube section outlets, and means on said gage means for indicating the desired angular position of said tube outlets.

2. Gage means according to claim 1 wherein said means for indicating the actual angular position of the tube outlets includes a pointer needle mounted for plumb disposition when said gage means is attached to said tube section, and said means for indicating the desired angular position of the tube outlet includes a scale disposed for coincident viewing with said pointer needle and calibrated in successive desired angular tube section positions.

3. Gage means according to claim 2 wherein said scale means includes a plurality of scales for indicating the desired successive angular tube section positions for a plurality of possible conveyor tube section arrays having differing numbers of tube sections, tube section lengths, and feed dispensing outlet locations.

4. Gage means according to claim 2 for use with tube sections including a gage alignment slot, wherein said attachment means including pin means mounted on the gage in fixed relation to said scale means, the pin being adapted for engagement with the gage alignment slot in the tube section.

5. Gage means according to claim 4 wherein said attachment means includes over-center clamp means for temporarily securing the gage means to said tube section in said predetermined position.

6. Gage means according to claim 4 for use with a tube section having a slot formed to a predetermined axial depth on the tube section, said gage having a width less than said depth for enabling the slot to simultaneously accommodate both said gage attachment means and a permanent clamp on the tube section.

7. A method of assembling a feeder system conveyor tube for encouraging simultaneous and equal distribution of feed from a distribution bin through a plurality of spaced conveyor tube outlets to feeding stations, each tube including a plurality of tube sections adapted for end to end assembly, the method comprising the steps of temporarily installing the conveyor tube sections in end to end relation, attaching an alignment gage to a first conveyor tube section in a predetermined position relative to the outlets, angularly rotating said first tube section to position the tube section and its feed outlets in a desired first predetermined angular position, permanently securing the first tube section in said desired first pre-determined angular position, attaching said alignment gage to a succeeding tube section, angularly positioning the succeeding tube section in another desired pre-determined angular position, permanently securing the succeeding tube section in its desired pre-determined angular position, and successively angularly positioning and permanently securing all the remaining tube sections of said conveyor tube.

8. A method of installing a feeder system conveyor tube according to claim 7 wherein the said first tube section to be aligned is that tube section closest to the distribution bin, and successive tube sections are angularly positioned in seriatim order progressing away from the bin and first tube section.

9. A method of installing a feeder system conveyor tube according to claim 7 including the steps of inserting a pin mounted upon said tube section alignment gage in a slot formed upon the tube section, clamping the gage to said tube section, twisting said tube length into the desired angular position, permanently securing the tube section in said desired angular position, and removing the gage from the tube section.

10. A method of installing a feeder system conveyor tube according to claim 8 including the step of noting the coincidence of the actual angular position of the tube section as indicated by a gage pointer with the desired angular position of the tube section as indicated upon a gage scale.

* * * * *